United States Patent Office 3,160,176
Patented Dec. 8, 1964

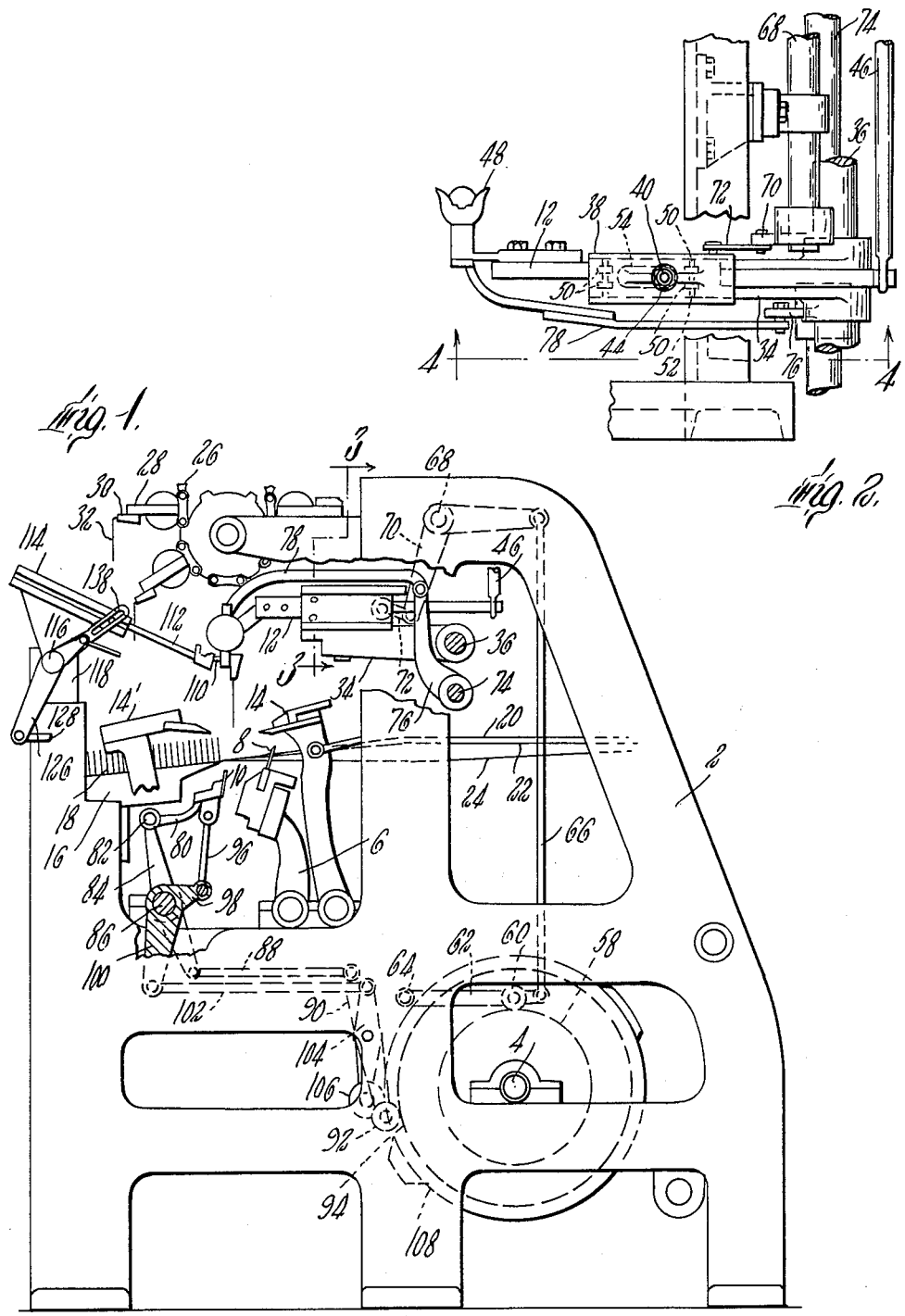

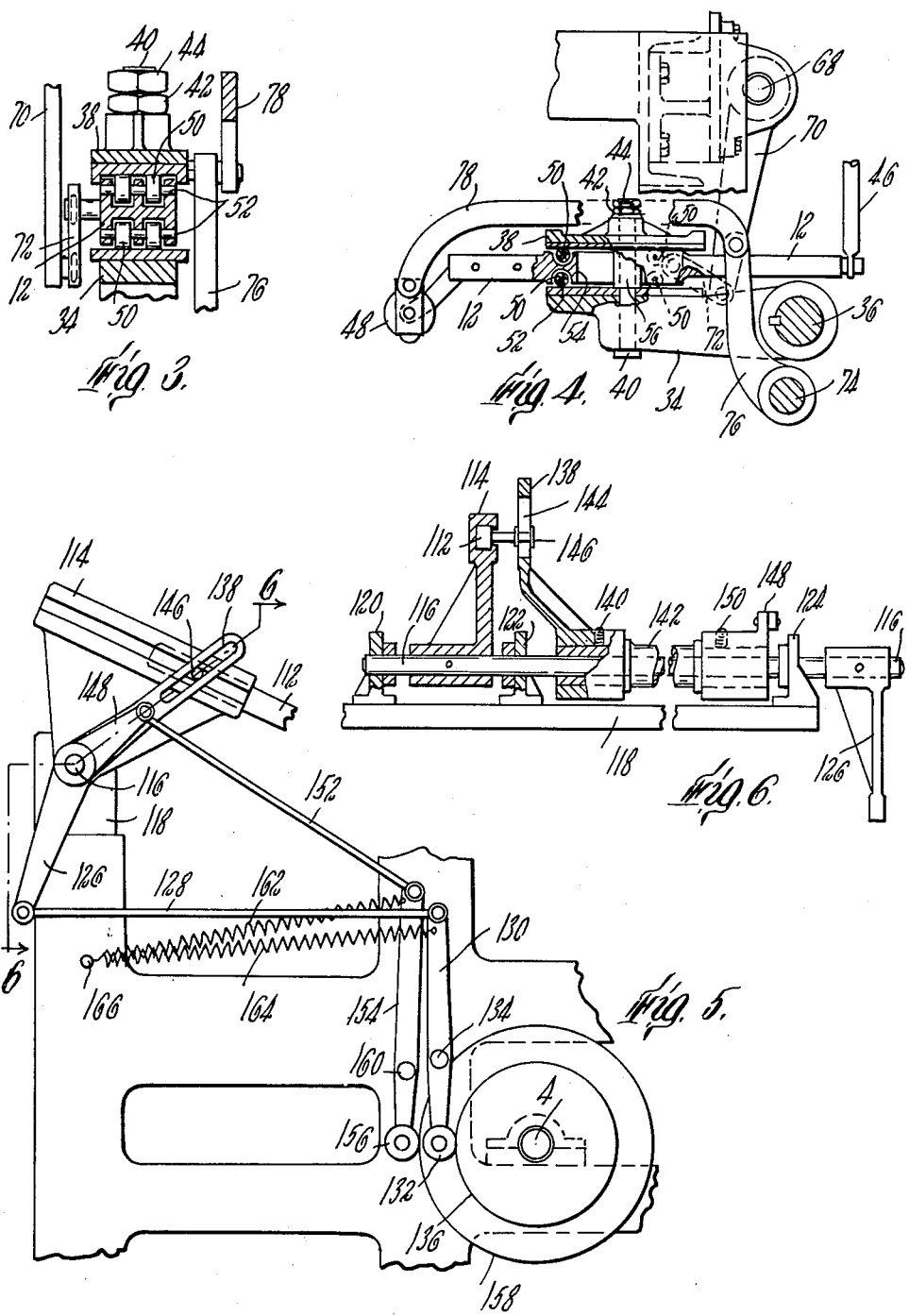

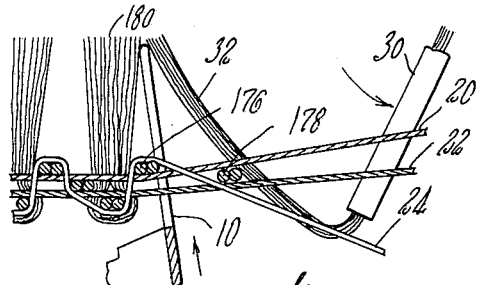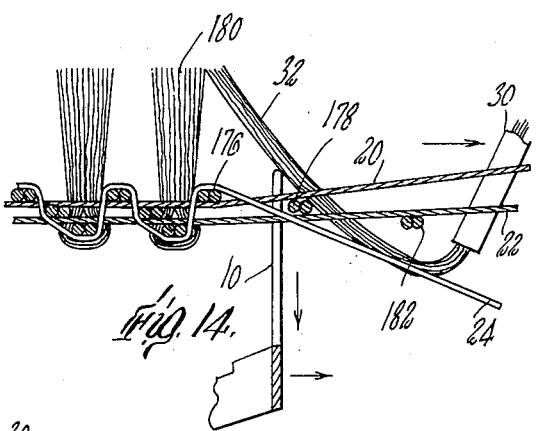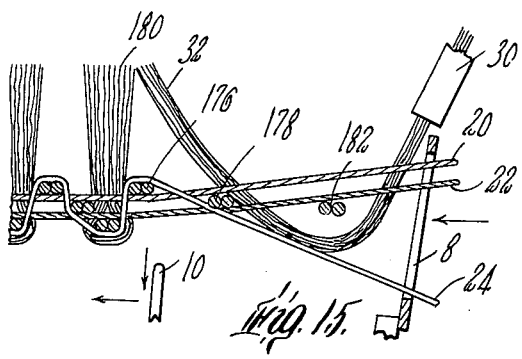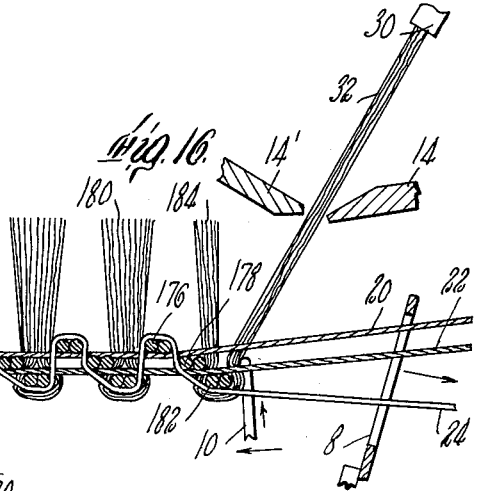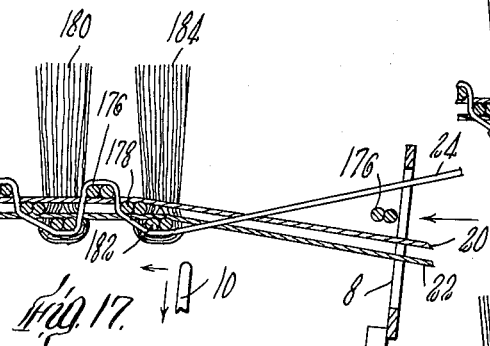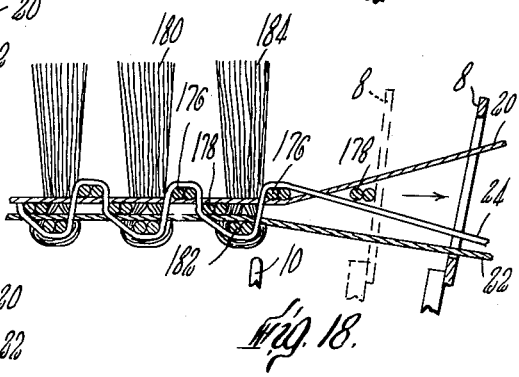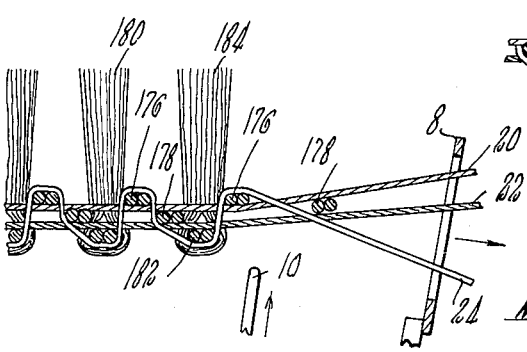

3,160,176
PROCESS FOR MAKING AXMINSTER TYPE CARPET
Wayne T. Harrison, Granby, and Raymond J. Carrigan, Thompsonville, Conn., assignors to Bigelow-Sanford, Inc., Thompsonville, Conn., a corporation of Delaware
Filed Jan. 25, 1963, Ser. No. 253,887
6 Claims. (Cl. 139—7)

The present invention relates to pile fabric floor coverings and more particularly to a process for the manufacture of an Axminster-type pattern-on-the-back carpet or rug having V-tuft pile of exceptional height. The present application is a continuation-in-part of our prior application Serial No. 210,732, filed July 18, 1962, now abandoned. Product and apparatus subject matter disclosed herein is claimed in our divisional application, Serial No. 397,092, filed September 17, 1964, entitled "Axminster Type Carpet and Apparatus for Making the Same."

There is a growing demand for carpets and rugs having pile of especially long length or height, in accordance with changing style demands. It has been found to be impossible to increase the length of the pile made by conventional methods on the conventional carpet looms sufficiently to meet this growing demand. In the wire-type carpet looms, the height of the pile is determined by the height of the wire. The wires cannot be higher than approximately 1″ without becoming impossible to manipulate in the loom at a reasonable speed of operation of the loom. With the conventional Axminster looms, the necessity of introducing the free ends of the pile yarns between the warp yarns of the shed has precluded sufficient increase in the length of the pile, as such longer pile ends will become entangled with each other and the binder and stuffer warps during the wipe-in, or cannot effectively be turned up by the comb. Nipper, or Servian type Axminster looms can produce somewhat higher pile, but not sufficiently high for the purpose.

The present invention has as an object to provide a process for the manufacture of an Axminster type carpet or rug having V-tuft pile of exceptional height.

A further object of the invention is to provide a process for the manufacture of an Axminster type carpet having V-tuft pile of exceptionally long length and having a pattern on the back.

A further object is to provide a process for the manufacture of such pattern-on-the-back long length pile tuft carpet by machine.

Further objects, features and advantages of the invention will become apparent from the following description of presently preferred embodiments of the invention, in which description reference is made to the accompanying drawings, wherein:

FIG. 1 is an end elevation, partly broken away, of a loom embodying the invention;

FIG. 2 is a detailed plan view, with certain parts removed or broken away for clarity of illustration, of a spool transfer arm and operating mechanism therefor;

FIG. 3 is a vertical sectional view taken on line 3—3 of FIG. 1 looking in the direction of the arrows;

FIG. 4 is a detailed sectional view on line 4—4 of FIG. 2, partly broken away;

FIG. 5 is an end elevation of the loom, partly broken away, showing mechanism provided for supporting and lifting the middle of a tube frame which is carried in the transfer arms;

FIG. 6 is a vertical sectional view taken on line 6—6 of FIG. 5, looking in the direction of the arrows;

FIGS. 13–19 are schematic views similar to FIGS. 7–12, but illustrating a modification.

Figure 7:
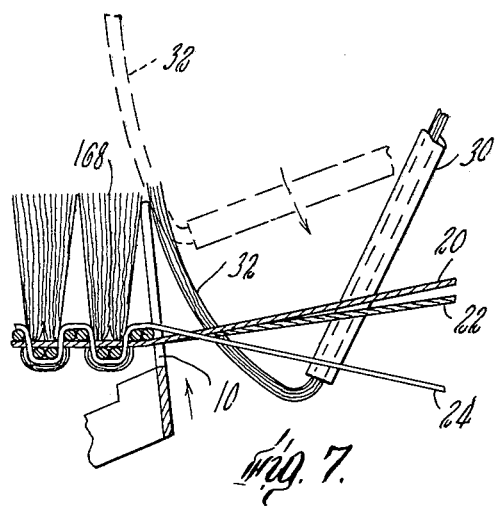
FIGS. 7–12 are schematic warpwise vertical sectional views of the carpet in the loom at the weaving point, illustrating successive steps in the weaving operation.
Figure 8:
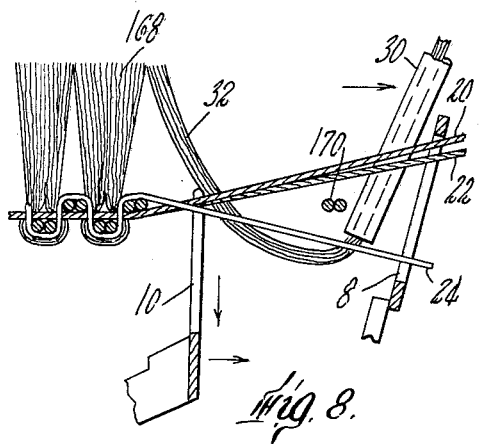
Figure 9:
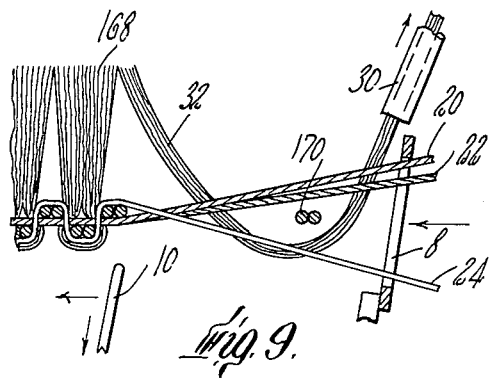
Figure 10:
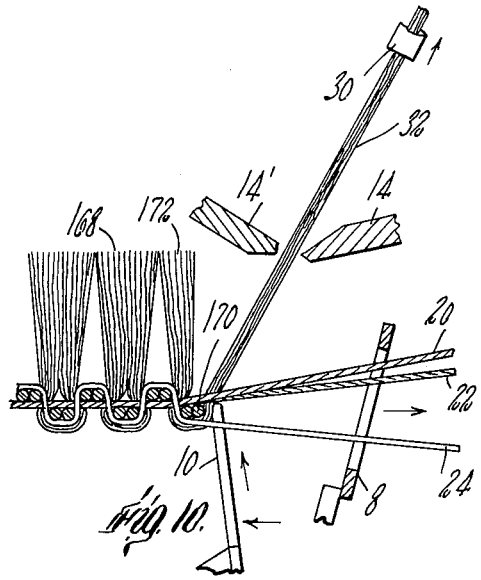

In accordance with the invention we provide a modified Axminster type weaving process which is capable of producing Axminster type, pattern-on-the-back carpet having V-tufts of exceptional height as contrasted with the pile tufts of heretofore known machine made carpet. The process of the invention provides a carpet wherein the pile tuft legs may be as long as 1⅛″ to 1⅞″, or more, in their extent above the backing structure of the carpet. In accordance with the invention the weaving process includes the steps of forming a first shed of binder and stuffer warp threads, raising the comb of the Axminster type loom through the binder warp threads to an exceptional height, sufficient to support substantially upright the pile tufts of the last previously formed row of pile tufts, and moving the comb forwardly against the previously formed weft-wise row of pile for that purpose. Pile yarns are then wiped into the shed by use of the Axminster loom tube frame, but in a direction which is the reverse of the conventional Axminster wipe-in motion, that is the free ends of the pile yarns protruding from the tube frame tubes are disposed at the fell of the fabric so that as the tube frame is rocked to insert the tubes into the shed, the free ends of pile yarn protruding therefrom are wiped across the last formed row of pile tufts while they are so supported by the comb. At the end of the wipe-in rocking motion of the tube frame, the tube frame is bodily moved rearwardly of the loom, to a position close to the reed when in its rearward position. The comb, preferably at the same time, is moved simultaneously downwardly and rearwardly, remaining in contact with the free ends of the pile yarns to support them. A first, or holding, shot of double weft is inserted into the first shed by the weft inserting needle. The yarns are looped about the holding weft shot as the tube frame begins to rise in the drawoff motion, the comb is withdrawn from the warp threads and moved downwardly and forwardly to permit the reed to move fully forward to the fell of the fabric and the reed beats forward to beat the holding weft shot and the pile yarn looped about it to the fell of the fabric. Thereafter, the comb is again raised, but this time to a lesser height than before, into the warp threads and moved forwardly to engage the pile yarns at the point where they are looped about the holding weft shot, to hold the yarns against the shot during the subsequent drawoff and cutting operations. After the draw-off motion of the tube frame, the pile yarns are severed by knives spaced exceptionally far above the shed, to form a row of V-tuft pile tufts of exceptional height. Following the pile yarn severing operation, the comb is moved downwardly and forwardly to clear the shed, the warps are reversed to form a second shed, and a second, or upper weft is inserted into the second shed and beaten forward by the reed. In the meantime, following the yarn severing operation, the transfer arms return to their forward position and replace the tube frame in the tube frame chain and take the succeeding tube frame from the chain. If the fabric is a 2-shot fabric, the cycle of operation is then repeated to form succeeding rows of pile tufts. If a 3-shot fabric is desired, a third shed is appropriately formed to receive a third, or intermediate weft shot and this intermediate weft is inserted into the third shed. The reed then moves forward but on this movement the reed stops short of the fell, thereby only partially beating up the intermediate weft shot. This completes the weaving cycle for the 3-shot embodiment, and the cycle is repeated to form succeeding rows of pile tufts, the intermediate weft shot being beaten fully forward into the fell upon the next beat of the reed, i.e., the beat which beats up the first weft shot.

The loom employed in the practice of the process is substantially a conventional Axminster carpet loom, but modified in certain respects to carry out the process of the invention, and includes warp shed forming means, means such as the conventional needle for inserting wefts, the lay, the comb, the tube frame carrier chain with tube frames thereon including tubes with yarn protruding therefrom, means including transfer arms for removing the tube frames one by one from the carrier chain and manipulating them to introduce pile yarns into the warp sheds, and other necessary and conventional Axminster loom elements. The loom is modified by raising the knives to an exceptional height above the warps, nearly to the point where the tube frames are removed from the carrier chain, and the tube frame in the drawoff movement is raised to an exceptional height. The transfer arm operating mechanism is provided with means whereby a tube frame when in the shed and supported by the transfer arms may be moved bodily forwardly and rearwardly of the loom. The height of the comb is increased, its slots are cut deeper than normal and its operating cams are modified to give it a set of movements radically different from the conventional ones. The tube frame supporting and lifting mechanism at the back of the loom is removed and a novel mechanism is provided at the front of the loom, forwardly of the weaving point, for supporting and lifting the middle portion of the tube frame which is in the transfer arms. The cams of the loom are modified to provide an exceptionally long drawoff motion of the tube frames and other modified motions as will be described hereinafter in greater detail.

Referring now to the particular specific embodiments of the loom, process and fabric to be described for the purpose of disclosure of the invention, and referring to the drawings, the loom is in general organization and construction similar to the conventional Axminster looms shown for example in the Holland Patent No. 1,898,988 or the Cooper Patent No. 1,953,044, and comprises a main frame 2 carrying a main shaft 4, a lay 6, with a reed 8, a comb 10, a pair of transfer arms 12, one on each side of the loom as is conventional, knives 14, and 14' for cutting the pile yarns, and a breast beam 16 over which the carpet 18 as it is woven is drawn forwardly to be wound up on a roll (not shown). Stuffer warps 20, 22 and binder warp threads 24 pass forwardly to the weaving point or fell from conventional warp beams (not shown), and are raised and lowered to form the sheds by conventional heddles (not shown). The wefts are inserted into the sheds formed by the binder and stuffer warps, by means of the usual Axminster needle as a double weft shot, as is conventional. A tube frame carrier chain 26, having the principal part of its length disposed overhead, leads downwardly at a point adjacent the weaving point to bring the tube frames 28 carried thereby successively to the weaving point. Each tube frame, as is conventional, carries a number of tubes 30, corresponding to the number of pile yarns to be employed per weftwise row of pile, through which tubes are led the free ends 32 of pile yarns from spools carried in the tube frame. The tube frame chain 26 is intermittently operated step-by-step to bring the tube frames in succession to the weaving point, where they are removed from the chain by the transfer arms 12, lowered toward the shed and manipulated as hereinafter described to insert pile yarns into the backing of the fabric and then, when the yarns have been severed, returned to the tube frame chain.

Each transfer arm 12 is carried on a support 34 keyed to a transverse shaft 36 for upward and downward swinging movement. The transfer arm 12 is mounted for forward and backward sliding movement and for side to side swinging movement on the support 34. For this purpose a cage 38 of generally oblong form is disposed on an upper flat surface of the support 34 for pivotal movement about the axis of a stud 40 passing vertically through the support 34 and having the nut 42 and lock nut 44 on its upper end to permit removal of the cage 38. The sidewise swinging movement of transfer arm 12 is effected by a pull rod 46 in conventional manner. The other transfer arm 12 is simultaneously moved in the opposite direction, whereby the clutches 48 carried at the forward ends of the transfer arms 12 are separated, when the transfer arms are in raised position, to embrace a tube frame 28 on the chain 26 and the clutches 48 then moved simultaneously toward each other to grasp the tube frame and hold it in position between the clutches 48 as the transfer arms 12 are manipulated to detach the tube frame from the chain, lower it to the weaving position and manipulate it as desired.

The transfer arm 12 carries eight rollers 50 rotatable on transverse axles 52 and running on flat surfaces inside the cage 38 to permit the forward and backward movement of the transfer arms 12 and thus of the tube frame 28 held in the clutches 48. The transfer arm 12 is provided with an elongated opening 54 of a transverse width to snugly receive bushing 56 surrounding stud 40. Forward and backward movement of the transfer arm 12 is controlled by a cam 58 on the main shaft 4. Cam 58 moves cam follower roll 60 to cause pivotal movement of cam lever 62 about its fixed pivot 64 on the loom frame. Through pull rod 66 the cam lever 62 imparts rocking movement to transverse shaft 68 and correspondingly to the arm 70 fixed thereto. The lower end of arm 70 is connected to the transfer arm 12 to move the arm 12 forwardly and backwardly, through a link 72 having a ball-joint connection to arm 70 and transfer arm 12.

The loom further includes conventional means for rocking the tube frame clutches 48 about a transverse horizontal axis. Such means in the loom illustrated include a rock shaft 74 connected through arm 76 and link 78 to the clutch 48.

The comb 10 is adapted to be moved upwardly and downwardly and forwardly and backwardly. The comb 10 is supported on an arm 80, pivoted at 82 to a link 84 in turn pivoted on a shaft 86. The link 84 is connected through a pull rod 88 to a cam follower lever 90 carrying a cam follower roller 92 running on the periphery of cam 94 carried on the main shaft 4. Rocking movement imparted to the lever 84 by the cam 94 moves the comb backwardly and forwardly. The comb 10 also is connected through a push rod 96 to one arm of a bell crank lever 98 pivoted on the shaft 86 and having its opposite arm 100 connected through a pull rod 102 to a cam follower lever 104 carrying cam follower roller 106, which runs on the periphery of a cam 108 carried on the main shaft 4. The cam 108 thus is adapted to move the comb 10 upwardly and downwardly. The cams 108 and 94 are designed to impart to the comb 10 motions which are substantially different from the comb motion of the conventional Axminster loom, as will be described hereinafter.

The loom is further provided with a novel means for supporting and lifting the middle portion of the tube frame 28 which is carried in the clutches 48. This novel mechanism is mounted adjacent the breast beam, forwardly of the weaving point. For this purpose, the tube frames are provided with an opening in their forward face near the middle of the tube frame. A lifting finger 110, which is adapted to engage the tube frame by being inserted in this opening, is carried on a slide 112 mounted for forward and backward sliding movement in a guide member 114 pinned to a shaft 116 extending transversely of the loom and supported on a support member 118 extending transversely of the loom adjacent the breast beam 16. The shaft 116 is supported on the support member 118 for rotation thereon in spaced bearings 120, 122 and 124. The shaft 116 is adapted to be rocked to move the guide member 114 by means of an arm 126, pinned to the shaft 116 and having its lower end connected by a push rod 128 to a lever 130 carrying at its lower end a cam follower roll 132 and pivoted on the frame at 134. The cam follower roll 132 runs on the periphery of a cam disc 136 carried on the main shaft 4.

The slide 112 is adapted to be moved toward and from the tube frame, to keep the finger 110 in proper engagement with the tube frame as it is raised and lowered by the rocking motion of the guide member 114 about the axis of the shaft 116, by means of a slotted lever 138 fixed by a set screw 140 to a tube 142 surrounding and supported on the shaft 116 for rotation thereon. The arm 138 contains a slot 144 in which is engaged the pin 146 fixed to the slide 112, so that oscillating movement of the arm 138, imparted to it by oscillating movement of the tube 142, causes the slide 112 to be moved inwardly and outwardly of the guide member 114. The tube 142 is oscillated by means of a lever 148 fixed thereto by a set screw 150 and connected through a pull rod 152 to a cam follower lever 154 carrying at its lower end a cam follower roll 156 running on the periphery of cam disk 158 carried on the main shaft 4. The cam lever 154 is pivoted on the frame at 160. Springs 162 and 164 anchored to the frame at 166 and connected respectively to the upper ends of the levers 154 and 130 maintain the cam followers 132 and 156 in contact with their respective cams. Thus under the control of the cam 158 the tube frame lifting finger 110 is moved as required to keep it in engagement with the tube frame as the tube frame is operated by the transfer arms 12 and as the guide member 114 is rocked to apply a supporting and lifting force to the middle portion of the tube frame to prevent sagging of the middle portion of the tube frame.

In wider width looms, such as 12 foot or wider, more than one lifting finger and associated operating mechanism may be provided.

Figure 11:
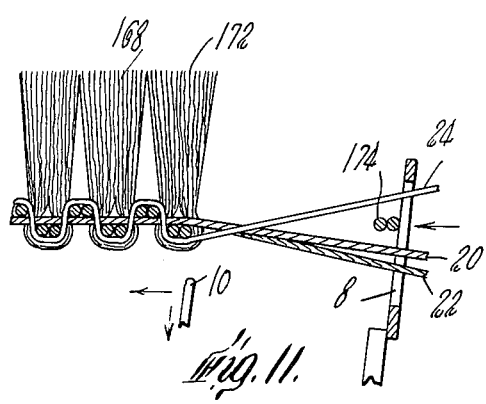
Figure 12:
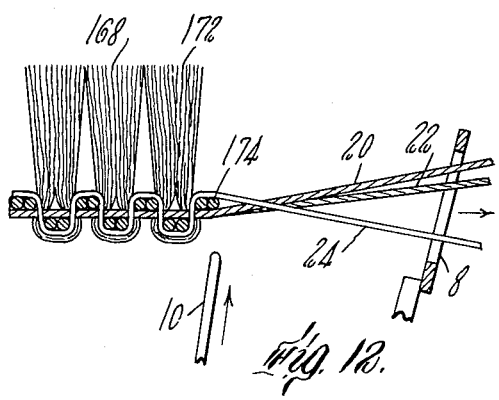

Referring now to FIGS. 7–12 in which are schematically shown successive phases of the weaving process of the invention as applied to the manufacture of 2-shot fabric, a first shed is formed, FIG. 12, by stuffer warps 20 and 22 in the upper shed and the binder warp 24 in the lower shed. The comb 10 is raised as shown in FIG. 7 to a much greater than normal height and is moved forwardly to engage and support the pile tufts 168 of the last previously formed row. A tube frame 28 is removed from the tube frame carrier chain 26 by the clutches 48 of the transfer arms 12 and the tubes 30 are wiped into the shed by a downward and rearward rocking motion, as illustrated in FIG. 7, which is in the direction opposite to the conventional Axminster wipe-in motion, the free ends 32 of the pile yarns being disposed toward the fell and moving downwardly and across the pile tufts of the last previous row 168 as they are wiped in. At the end of the rocking motion, the tubes 30 are bodily moved rearwardly, FIG. 8, by rearward movement of the transfer arms 12 within the cage 38, as previously described. As the tubes 30 are moved rearwardly, the comb 10 is moved downwardly and rearwardly, remaining in contact, however, with the free ends 32 of the pile yarns to support them. As the tubes approach or reach the end of the rearward movement, a first, lower or holding shot of double weft 170 is inserted into the first shed by the loom needle above the yarns 32, as appears in FIG. 8. The tubes 30 then begin to move upwardly in a draw-off motion to loop the pile yarn 32 about the weft 170 and to draw additional yarn from the spools of the tube frame. As the tubes 30 clear the shed at the beginning of the draw-off motion, FIG. 9, to loop the yarns about the weft 170, the reed 8 begins its forward motion to beat the first weft and the pile yarns forwardly into the fabric, the comb 10 having now moved downwardly and forwardly out of the shed. Following the forward beat of the reed, the comb 10 is again raised into the shed, FIG. 10, but to a lesser height than before to bring its upper end into contact with the newly formed row 172 of pile tufts at the portions of the tufts which are looped about the weft 170. The comb, when it has been raised to the point where it engages the bases of the pile tufts, moves forwardly to clamp the pile yarns to hold them in position during the following upward draw-off motion of the tubes 30. The draw-off motion is longer than usual and the tube frames are raised to a position adjacent the carrier chain 26, whereupon the pile yarns 32 are severed by the knives 14, 14'.

The shed is reversed, FIG. 11, to form a second shed with the binder warp 24 in the upper shed and the stuffer warps 20, 22 in the lower shed. The comb is moved downwardly and forwardly to clear the shed, and a second, or upper weft 174 is introduced by the needle into the second shed, FIG. 11, and beaten forwardly by the reed 8 to the fell of the fabric. In the meantime the tube frame has been returned to its forward position and raised and replaced in the carrier chain 26. The described weaving operations are repeated to form succeeding rows of pile tufts.

The weaving cycle so far described is a two-shot cycle as contrasted with the normal 3-shot cycle of the Axminster loom, and the fabric is a 2-shot, 2-weft plane fabric. Nevertheless, two warps are employed in one of the sheds, in effect serving as a stuffer warp separating the lower, holding wefts 170 from the upper wefts 174 to provide a 2-weft plane fabric. The pile tufts are looped about the wefts 170 of the lower plane thereby providing a pattern-on-the-back type fabric.

It is equally within the invention to employ a 3-shot cycle to form a 3-weft plane fabric. Referring to FIGS. 13–19, a first shed is formed, FIG. 19, by stuffer warps 20 and 22 in the upper shed and the binder warp 24 in the lower shed. At this stage, the last weft to have been beaten fully forward into the fabric is an upper weft 176. An intermediate weft 178 has been inserted and beaten only partially toward the fell, as hereinafter described. The comb 10 is raised, FIG. 13, between wefts 176 and 178 to a much greater than normal height and is moved forwardly to engage and support the pile tufts of the last previously formed row 180.

A tube frame 28 is removed from the tube frame carrier chain 26 by the clutches 48 of the transfer arms 12 and the tubes 30 thereof are wiped into the first shed by a downward and rearward rocking motion, as illustrated in FIG. 13, which is in the direction opposite to the conventional Axminster wipe-in motion, the free ends 32 of the pile yarns being disposed toward the fell and moving downwardly and across the pile tufts of the last previously formed row 180 as they are wiped in. At the end of the rocking motion, the tubes 30 are bodily moved rearwardly, FIG. 14, by a rearward movement of the transfer arms 12 within the cage 38, as previously described. As the tubes 30 are moved rearwardly, the comb 10 is moved downwardly and rearwardly, remaining in contact, however, with the free ends 32 of the pile yarns to support them. As the tubes 30 approach or reach the end of the rearward movement, a first, lower or holding shot of double weft 182 is inserted into the first shed by the loom needle above the yarns 32, as appears in FIG. 14. The tubes 30 then begin to move upwardly in a draw-off motion to loop the pile yarns 32 about the weft 182 and to draw additional yarn from the spools of the tube frame. As the tubes 30 clear the shed at the beginning of the draw-off motion, FIG. 15, the reed 8 begins its forward motion to beat the first weft and the pile yarns forwardly into the fabric, the comb 10 having now moved downwardly and forwardly out of the shed. This forward beat of the reed also carries the last-inserted intermediate weft 178 forwardly into the shed ahead of the first weft 182. Following the forward beat of the reed, the comb 10 is again raised into the shed, FIG. 16, but to a lesser height than before to bring its upper end into contact with the newly formed row 184 of pile tufts at the portions of the tufts which are looped about the weft 182. The comb, when it has been raised to the point where it engages the bases of the pile tufts, moves forwardly to clamp the pile yarns to hold them in position during the following upward draw-off motion of the tubes 30. As before, the draw-off motion is longer than usual and the tube frames are raised to a position adjacent the carrier chain 26, whereupon the pile yarns 32 are severed by the knives 14, 14'.

The shed is reversed, FIG. 17, to form a second shed with the binder warp 24 in the upper shed and the stuffer warps 20, 22 in the lower shed. The comb is moved downwardly to clear the shed, and a second, or upper, weft 176 is introduced by the needle into the second shed and beaten forwardly by the reed 8 to the fell of the fabric.

The shed is changed, FIG. 18, to form a third shed with the stuffer warp 20 in the upper shed and the stuffer warp 22 and binder warp 24 in the lower shed. The comb remains down and forward. A third or intermediate weft 178 is inserted by the needle into the third shed. The reed 8 then moves forwardly but on this beat the reed is stopped short of the fell, as indicated in dotted lines in FIG. 18, thereby only partially beating up the intermediate weft 178. In the meantime, the tube frame has been returned to its forward position and raised and replaced in the carrier chain 26. The described operations are repeated in successive cycles to form successive weftwise rows of pile.

By the weaving operations described, it is possible to produce an Axminister type pile fabric floor covering having exceptionally high pile tufts, higher than have heretofore been found possible with an Axminster loom, such exceptionally high pile tufts providing an unusually thick and heavy pile of excellent appearance and handle. Despite the reverse direction of the pile yarn wipe-in motion, the comb is employed, but the comb is not employed as a comb in the sense this term has heretofore been understood in the Axminister weaving art. Instead of being employed as heretofore to turn up free ends of pile yarns to form the second leg of the tuft, the comb is employed as a support to hold up and maintain in position the preceding row of pile tufts to make possible the reverse wipe-in motion with pile tufts of such exceptional height. Further, in its second put-up motion, the comb serves to clamp the yarns of the weftwise row of tufts then being formed, to hold them securely in position during the draw-off and severing operations so that a good uniform back is formed in the fabric.

The tube frame lifting device, heretofore located at the back of the loom so as to engage the back of the tube frames, is not employed, but instead the novel tube frame supporting and lifting mechanism described is provided. The weaving operations employed to produce the exceptionally high pile could not be carried out with the conventional lifting mechanism at the back of the loom.

The weaving process need not follow exactly the procedure described, as modifications may be made therein as will occur to those skilled in the art, while still obtaining the benefits of the invention. Thus, for example, the second put-up motion of the comb may be introduced earlier in the cycle and the cutting operation may be deferred until after the second or binding weft has been inserted and just as the reed begins its retraction. While this modification of the process provides more secure engagement and holding of the newly formed row of pile tufts during the draw-off and severing operations, it introduces delay and increases the length of the cycle, when employed with the 2-shot cycle, so that the loom must be operated at fewer picks per minute. Such modification of the weaving cycle may be advantageous, however, with certain types of pile yarn, for example yarns which are of a slippery character, or otherwise of such characteristics that it is difficult to weave them without producing an unsatisfactory back, due to slippage of the pile yarns about the holding weft during the weaving operation.

While particular embodiments of the loom and particular ways of practising the process have been described in detail for the purpose of disclosing the invention, it will be understood that the invention is not confined to these particular looms, processes and products but includes all of the subject matter embraced within the following claims.

We claim:
1. The method of weaving an Axminster type carpet characterized by pile in the form of exceptionally high V-tufts, comprising the operations of forming a first shed of binder and stuffer warp threads, raising a comb through said warp threads adjacent the fell of the fabric and moving the comb against the free side of the last previously formed and beaten up row of pile tufts to support the same, introducing a plurality of pile yarns between the warp threads of the first shed with their free ends disposed at the fell while the last previously formed pile tufts are so supported, inserting a holding weft shot into said first shed above said pile yarns, withdrawing the comb from the warp threads, looping the pile yarns about said holding weft shot, beating up said holding weft shot, again raising the comb into said first shed of warp threads and moving the comb into engagement wtih said pile yarns looped about said holding weft shot, severing said pile yarns to form a weftwise row of pile tufts, forming a second shed of said warp threads, inserting a second weft shot into said second shed, withdrawing the comb from the warp threads, beating up said second weft shot, and repeating said operations to form succeeding weftwise rows of pile tufts.

2. The method of weaving an Axminster type carpet characterized by pile in the form of exceptionally high V-tufts, comprising the operations of forming a first shed of binder and stuffer warp threads, raising a comb through said warp threads adjacent the fell of the fabric and moving the comb against the free side of the last previously formed and beaten up row of pile tufts to support the same, introducing a plurality of pile yarns between the warp threads of the first shed with their free ends disposed at the fell while the last previously formed pile tufts are so supported, inserting a holding weft shot into said first shed above said pile yarns, withdrawing the comb from the warp threads, looping the pile yarns about said holding weft shot, beating up said holding weft shot, again raising the comb into said first shed of warp threads and moving the comb into engagement with said pile yarns looped about said holding weft shot, severing said pile yarns to form a weftwise row of pile tufts, thereafter forming a second shed of said warp threads, inserting a second weft shot into said second shed, withdrawing the comb from the warp threads, beating up said second weft shot, and repeating said operations to form succeeding weftwise rows of pile tufts.

3. The method of weaving an Axminster type carpet characterized by pile in the form of exceptionally high V-tufts, comprising the operations of forming a first shed of binder and stuffer warp threads, raising a comb through said warp threads adjacent the fell of the fabric and moving the comb against the free side of the last previously formed and beaten up row of pile tufts to support the same, introducing a plurality of pile yarns between the warp threads of the first shed with their free ends disposed at the fell while the last previously formed pile tufts are so supported, inserting a holding weft shot into said first shed above said pile yarns, withdrawing the comb from the warp threads, looping the pile yarns about said holding weft shot, beating up said holding weft shot, again raising the comb into said first shed of warp threads and moving the comb into engagement with said pile yarns looped about said holding weft shot, forming a second shed of said warp threads, inserting a second weft shot into said second shed, withdrawing the comb from engagement with the pile yarns looped about the holding weft shot, beating up said second weft shot and thereafter severing said pile yarns to form a weftwise row of pile tufts, and repeating said operations to form succeeding weftwise rows of pile tufts.

4. The method of weaving an Axminster type pattern-on-the back carpet characterized by pile in the form of exceptionally high V-tufts, comprising the operations of forming a first shed of binder and stuffer warp threads, raising a comb through the warp threads adjacent the fell of the fabric and moving the comb against the free side of the last previously formed and beaten-up row of pile tufts to support the same, introducing a plurality of pile yarns between the warp threads of said shed with their free ends disposed at the fell while the last previously formed pile tufts are so supported, moving said comb down and rearwardly within said shed to support said free ends of the pile yarns and thereafter inserting a holding weft shot into said shed above said pile yarns, withdrawing the comb from the warp threads and moving it forwardly, looping the pile yarns about said holding weft shot, beating up said holding weft shot, again raising the comb into said first shed of warp threads to a lesser height than before and moving the comb into engagement with said pile yarns looped about said holding weft shot to hold the pile yarns against said holding weft shot, severing said pile yarns to form a weftwise row of pile tufts having legs of substantially equal length, forming a second shed of said warp threads, inserting a second weft shot into said second shed, withdrawing the comb from the warp threads and moving it forwardly, beating up said second weft shot, and repeating said operations to form succeeding weftwise rows of pile tufts.

5. The method of weaving a 2-shot Axminster type carpet characterized by pile in the form of exceptionally high V-tufts, comprising the operations of forming a first shed of binder and stuffer warp threads with stuffer warp threads in the upper shed and binder warp threads in the lower shed, raising a comb through said warp threads adjacent the fell of the fabric and moving the comb against the free side of the last previously formed and beaten up row of pile tufts to support the same, introducing a plurality of pile yarns between the warp threads of the first shed with their free ends disposed at the fell while the last previously formed pile tufts are so supported, inserting a holding weft shot into said first shed above said pile yarns, withdrawing the comb from the warp threads, looping the pile yarns about said holding weft shot, beating up said holding weft shot, again raising the comb into said first shed of warp threads and moving the comb into engagement with said pile yarns looped about said holding weft shot, severing said pile yarns to form a weftwise row of pile tufts, reversing said warp threads to form a second shed with said binder warp threads in the upper shed and said stuffer warp threads in the lower shed, inserting a second weft shot into said second shed, withdrawing the comb from the warp threads, beating up said second weft shot, and repeating said operations to form succeeding weftwise rows of pile tufts.

6. The method of weaving a 3-shot Axminster type carpet characterized by pile in the form of exceptionally high V-tufts, comprising the operations of forming a first shed of binder and stuffer warp threads with two warps of stuffer threads in the upper shed and a binder warp in the lower shed, raising a comb through said warp threads adjacent the fell of the fabric and moving the comb against the free side of the last previously formed and beaten up row of pile tufts to support the same, introducing a plurality of pile yarns between the warp threads of the first shed with their free ends disposed at the fell while the last previously formed pile tufts are so supported, inserting a holding weft shot into said first shed above said pile yarns, withdrawing the comb from the warp threads, looping the pile yarns about said holding weft shot, beating up said holding weft shot, again raising the comb into said first shed of warp threads and moving the comb into engagement with said pile yarns looped about said holding weft shot, severing said pile yarns to form a weftwise row of pile tufts, thereafter forming a second shed of said warp threads with said binder warp in the upper shed and said two stuffer warps in the lower shed, inserting an upper weft shot into said second shed, withdrawing the comb from the warp threads, beating up said upper weft shot, forming a third shed with one of said stuffer warps in the upper shed and with said binder warp and the other stuffer warp in the lower shed, inserting an intermediate weft into said third shed and beating up said intermediate weft only part way to the fell, and repeating said operations to form succeeding weftwise rows of pile tufts.

References Cited by the Examiner

UNITED STATES PATENTS

| | | | |
|---|---|---|---|
| 712,888 | 11/02 | Wyman et al. | 139—7 |
| 1,865,221 | 6/32 | Stone | 139—9 |
| 1,904,939 | 4/33 | Barrett | 139—401 |
| 1,968,003 | 7/34 | Shaw et al. | 139—401 |
| 1,997,046 | 4/35 | Dacey | 139—9 |
| 2,020,400 | 11/35 | Dacey | 139—7 |
| 2,437,378 | 3/48 | Clarke | 139—401 |
| 2,794,449 | 6/57 | Matthews | 139—401 |
| 2,945,511 | 7/60 | Reinhardt | 139—7 |
| 2,946,350 | 7/60 | Worth | 139—7 |
| 2,986,174 | 5/61 | Worth | 139—401 |

MERVIN STEIN, *Primary Examiner.*

RUSSELL C. MADER, DONALD W. PARKER,
*Examiners.*